R. H. GARMAN.
BOOK FOR CHILDREN.
APPLICATION FILED OCT. 29, 1913.
1,110,434.  Patented Sept. 15, 1914.
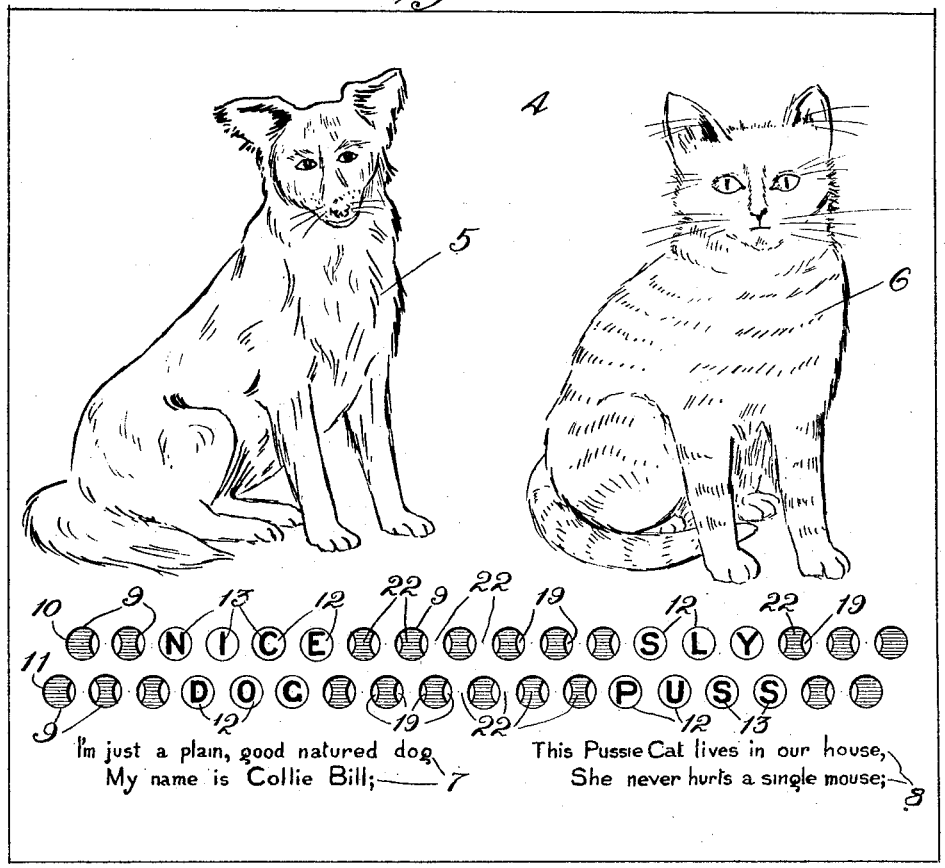
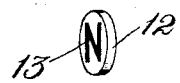
Witnesses:
Inventor:
Raymond H. Garman.

UNITED STATES PATENT OFFICE.

RAYMOND H. GARMAN, OF CHICAGO, ILLINOIS.

BOOK FOR CHILDREN.

1,110,434.  Specification of Letters Patent.  Patented Sept. 15, 1914.

Application filed October 29, 1913. Serial No. 798,132.

*To all whom it may concern:*

Be it known that I, RAYMOND H. GARMAN, a citizen of the United States, residing at Chicago, in the county of Cook and State of Illinois, have invented certain new and useful Improvements in Books for Children, of which the following is a specification.

The present invention relates to a book which is in the nature of a toy or plaything, and by the use of which the education of the child is developed.

The objects of the present invention are to provide the pages of the book with illustrative matter; to provide means for adding to said page temporary reading matter, whereby the child is made conversant with the spelling of words and with the elements of composition of reading matter; to so arrange the openings or perforations in the page, which receive the members having the characters thereon and by the arrangement of which temporary reading matter is added, as to bring out of alinement the letters of one line with the letters of another, thereby enabling the completed words to be easily read; and to arrange the perforations on one page in such relation to the perforations on another page as to form a backing for each of the perforations, thereby preventing the members when seated in the perforations from falling through and out of position.

The invention further consists in the features of construction and combination of parts hereinafter described and claimed.

In the drawings: Figure 1 is an elevation of a page made in conformity with the teachings of the present invention, and with certain temporary reading matter thereon; Fig. 2 is a section through a plurality of pages of the book of the present invention; and Fig. 3 is a perspective of one of the members which bear the characters by means of which the temporary reading matter is compiled.

It is a well known fact that in teaching young children to spell, the better method is to produce an illustration of the object, the name of which is to be spelled, because a child will ordinarily first acquire knowledge of the name by which a certain animal or object is called and will afterward acquire the spelling of the name. That is to say, a child, when it sees a dog, will recognize it as an animal called "dog" long before it has knowledge of the combination of letters which spell the word "dog", and hence in primers or other books intended to teach children the rudiments of spelling, it is customary to use a picture of the object and join with said picture the word which designates the object, whereby the child acquires a knowledge of the manner of spelling the name of the object, and thereby is made to understand that a certain combination of letters produces the word which he already knows signifies a particular object. In the present invention, this method of teaching children to spell words is utilized in a manner whereby the production of the spelled words affords entertainment for the child, and thereby the book partakes of the character of a toy.

Referring now to the drawings, and particularly to Fig. 1, a page 4 is illustrated which contains an illustration 5 of a dog, and an illustration 6 of a cat, and below the illustration of the dog are lines 7 of permanent printed matter containing a rhyme or other reading matter relating in a general way to said illustration, and there is also provided lines 8 of permanent printing matter which produces a rhyme or other reading matter relating to the illustration of the cat. Thus there is produced an illustration of a particular object and certain permanent reading matter relating to this object.

A series of holes or perforations 9 are provided on said page, and in the construction shown are arranged in an upper line 10 and a lower line 11, and it will be noticed that the perforations of the line 10 are offset or staggered as respects the perforations of the line 11, the purpose of which will more fully hereinafter appear.

A plurality of members 12 are provided, and upon the surface of each member is printed or otherwise formed a character 13 which comprises either letters or numbers, and these members 12 are designed and adapted to seat within the perforations 9. It is understood that the perforations may be of any suitable size and character, and that the members are formed in accordance to the size and character of the perforations. It is intended that the child shall place selected of these members in selected of said perforations, and to choose such members as shall have the proper character arranged thereon, whereby when such chosen members are arranged in proper order they will produce a word, which word will supply temporary printed matter to the page. This printed matter can be selected with a view of having it relate to the illustrations on the page, and if desired to form additional printed matter to the permanent printed matter on the page.

The reason why it is desirable to supply illustrations of the objects to which the word or words spelled out by the character relate has been previously explained. It not only is the accepted matter of teaching small children to spell, but it gives a basis or an object for the child to work on in spelling, as it would obviously be impractical to simply give the child a blank page filled with perforations and ask it to arrange characters on said perforations to spell the word. If the child has no object to work by, or any basis to work from, it would not arrive at any very definite result in the way of producing a spelled word, but if you place before it an illustration of a dog it will then have this as a basis for formulating a set of letters which will produce the word "dog", and, of course, in so formulating them will conceive of the spelling of this word.

The selecting of the members and arranging them in place according to the ideas of the child will afford amusement, and the book will, therefore, partake of the characteristics of a toy. There will also be amusement afforded by the child deciphering, or having deciphered for it, the permanent printed matter upon the page, and, moreover, the child may develop its faculties of composition by supplying temporary printed matter which will form an addition or supplement to the permanent printed matter already on the page. In the example shown in the drawing, the proper characters have been selected and placed in position to produce the words "nice dog" below the illustration of the dog, and the words "sly puss" below the illustration of the cat. Of course, this particular selection of words is merely for the purpose of illustration, it being intended to have the child exercise his own ideas to supply whatever words to the page he may deem best. By arranging the perforations of the row 10 in staggered relation to the perforations of the row 11, when a word is spelled out in the line 10, the letters thereof will never aline with the letters of any word in the line 11, thereby making the words easy of deciphering; and it will be readily understood that, taking a plurality of rows and arranging the letters in one row in exact alinement with the letters of the remaining rows, a confusion in reading would be produced, because the reader in reading from side to side of the page may become confused by the alined column of characters running from top to bottom of the page. By this particular arrangement of the openings shown in the drawings, the words on each of the lines are clearly and distinctly separated, and thus no possible confusion in reading them could occur.

Now referring to Fig. 2, a plurality of pages are illustrated, the first of which pages is designated by the numeral 4 to conform to the page shown in Fig. 1, and the second, third, and fourth pages are designated by its numerals 15, 16, and 17, respectively. The openings or perforations 9 in the page numbered 4 are arranged out of alinement with the openings 19 in the page 15, and the openings 20 in the page 16 are out of alinement with the opening 19 on the page 15, while the openings 21 in the page 17 are out of alinement with the openings 20 in the page 16; thus the openings or perforations in each of said pages is arranged out of alinement with the openings in the page next adjacent. The purpose of this is as follows: Each of the perforations is separated from one another by a solid portion 22 which, in effect, is a web, and the solid portion 22 on each of the pages is alined with the openings in the next adjacent page, whereby these solid portions form a backing lying beneath the openings, so that, when the members 13 are inserted within any of the said openings they will rest against one of the solid portions 22 between the openings in the page beneath, and thus said members, when positioned, will find a solid backing. This prevents the user, when positioning the members 12, from forcing the members clear through the openings and out of proper position, it being understood that said members are of a proportion whereby, when inserted within an opening, they lie approximately flush with the page. The reading matter produced upon the page by the insertion of the members 12 is of a temporary character, and can be removed at will by removing the inserted members.

The device, of course, is susceptible of modification as to arrangement, etc., and it is not the intention to limit the invention other than by the terms of the appended claims.

I claim:

1. A child's book comprising a plurality of pages, each provided with illustrative matter, and each having formed therein perforations arranged in a line, the perforations on one page being offset with respect to the perforations of the next adjacent page whereby a backing is provided beneath each perforation, members arranged to seat in said perforations, said members having characters on the face thereof whereby, when selected of said members are positioned in selected of said perforations, temporary reading matter is supplied to the page, substantially as described.

2. A child's book comprising a plurality of pages, each provided with illustrative matter, and each having perforations formed therein arranged in a line, the perforations on one page being offset with respect to the perforations on the next adjacent page whereby the solid portions between the perforations on one page aline with the perforations on the next adjacent page and form a backing beneath said latter perforations, members adapted to seat in said perforations, each member having a character on the surface whereby, when selected of said members are positioned within selected of said perforations, temporary reading matter is added to the page, substantially as described.

RAYMOND H. GARMAN.

Witnesses:
Wm. P. Bond,
Ephraim Banning.

Copies of this patent may be obtained for five cents each, by addressing the "Commissioner of Patents, Washington, D. C."